Nov. 11, 1952 — A. RAPPL — 2,617,136

MOTOR VEHICLE ACCESSORY SYSTEM

Filed Aug. 10, 1945 — 3 Sheets-Sheet 1

INVENTOR
ANTON RAPPL
BY
Beau, Brooks, Buckley & Beau ATTORNEYS

Nov. 11, 1952     A. RAPPL     2,617,136
MOTOR VEHICLE ACCESSORY SYSTEM
Filed Aug. 10, 1945     3 Sheets-Sheet 2
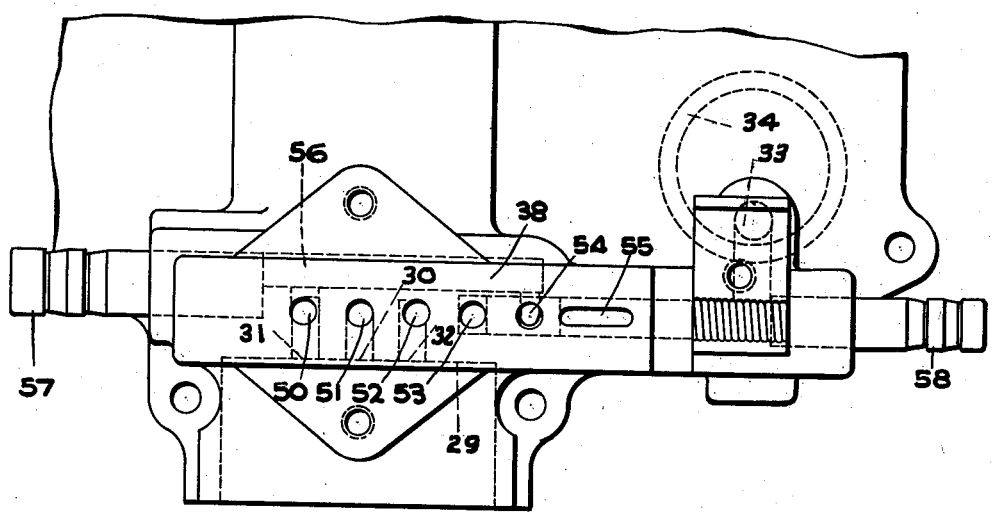
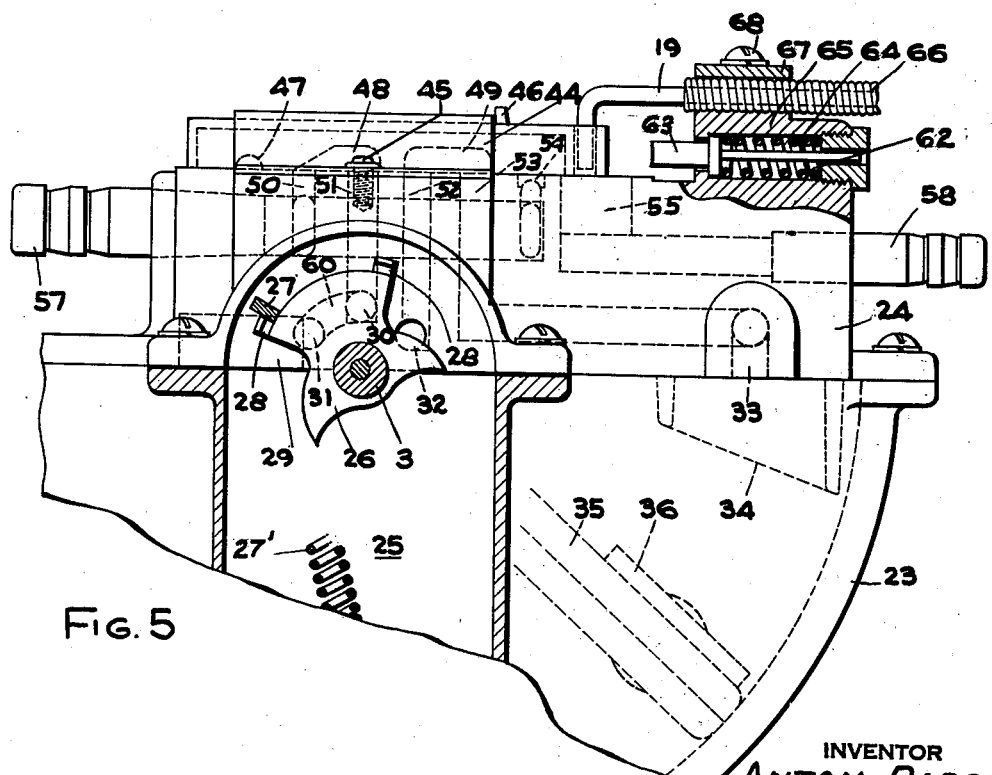
INVENTOR
ANTON RAPPL
BY
Beau, Brooks, Buckley & Beau ATTORNEYS

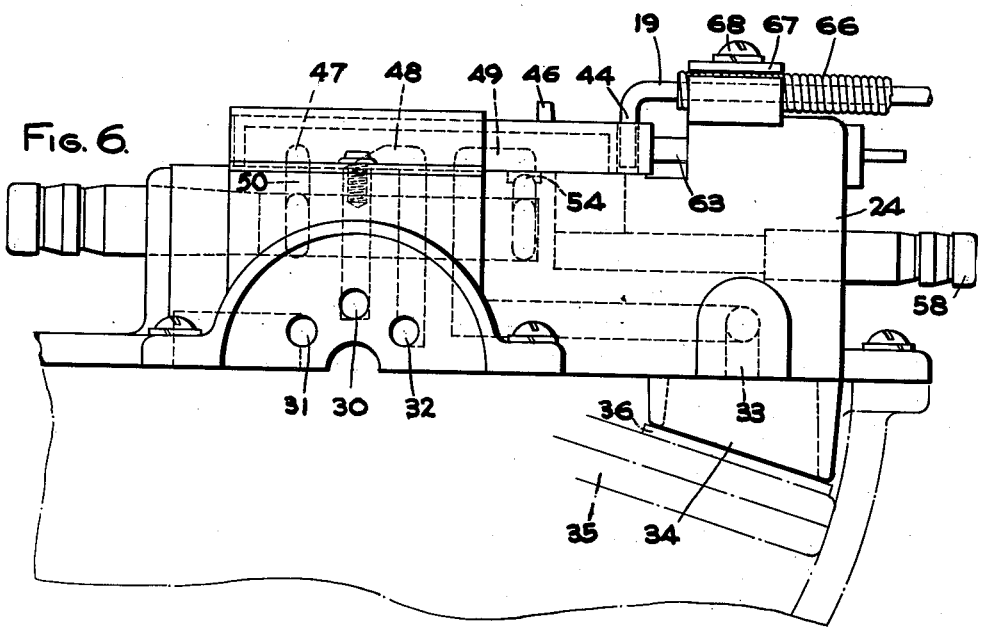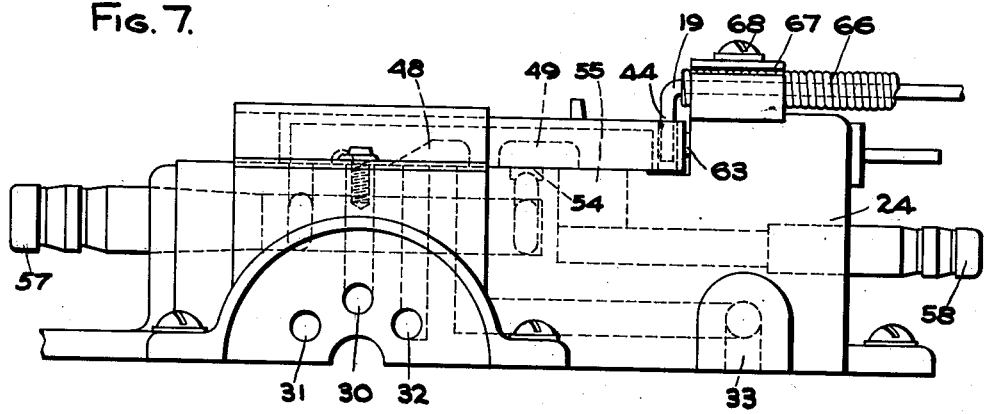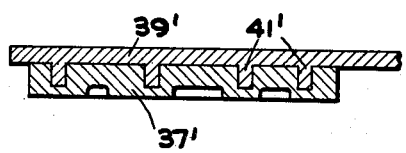

Patented Nov. 11, 1952

2,617,136

UNITED STATES PATENT OFFICE 2,617,136

MOTOR VEHICLE ACCESSORY SYSTEM

Anton Rappl, Eggertsville, N. Y., assignor to Trico Products Corporation, Buffalo, N. Y.

Application August 10, 1945, Serial No. 610,071

11 Claims. (Cl. 15—250.4)

1

This invention relates to a motor vehicle accessory system and particularly to one utilizing the subatmospheric or low pressure influence developed by the intake manifold or other suction producing part of the motor vehicle power plant.

Unsuccessful attempts have heretofore been made through means of a reserve chamber to maintain an adequate head of suction for the practical operation of the windshield cleaner during intervals in which the power plant would ordinarily fail to supply a sufficient amount of operating pressure, such as when the internal combustion engine is laboring under a wide open throttle and the fluctuating or variable intake manifold influence serving as the source of suction, is largely dissipated. The poppet type of check valve has proved efficacious in precluding the admission of air from the intake manifold to the reserve tank but the accessory control valve has been impractical and incapable of holding the reserve supply for dissipation. Consequently there has been a frequent failure of operation of the accessory when called upon during periods of engine rest.

The primary object of the present invention is to provide a suction operated accessory system in which a practical reserve supply of operating pressure will be maintained against any substantial dissipation whatsoever whereby the system will function satisfactorily after long periods of non-use to the full extent of the reserve capacity. Consequently, the aim of the present invention is to produce an accessory system which is both practical and well suited for the relatively low pressure differential encountered of necessity in the actuation of accessories by suction.

A further object of the invention is to provide a suction operated accessory system for use in cleaning the windshield of a motor vehicle which is practical and efficient in operation under normal conditions of vehicular travel.

Another object of the invention is to provide, in a windshield cleaning system having combined means for applying a liquid solvent to the windshield surface as well as for wiping the latter, an improved arrangement and construction by which the solvent applying and wiping functions may be utilized in a selective manner and to the best advantage for securing a greater cleaning efficiency.

Again, the invention has for its object to provide an improved suction actuated windshield cleaner motor from which the greatest satisfaction in use and the maximum efficiency in use may be obtained.

2

Furthermore, an important object is to provide an improved construction of slide valve which is highly efficient in use and economical of manufacture.

In the drawings:

Fig. 4 is a fragmentary view of the motor depicting the valve seat;

Figs. 5, 6 and 7 are fragmentary views of the motor illustrating the valve respectively in its motor operating position, in its motor arrested position, and in its washer operating position; and Fig. 8 is a longitudinal sectional view through a modified form of control valve.

Figure 1:
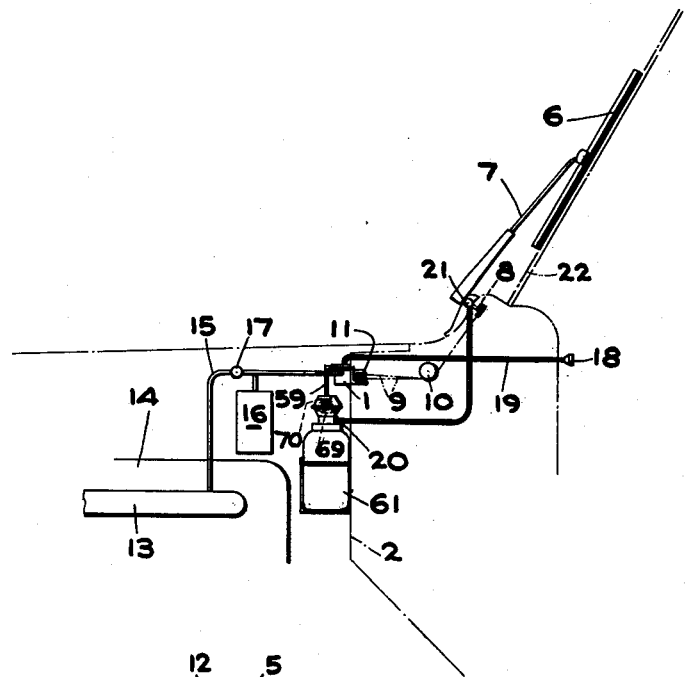
Fig. 1 is a diagrammatic view of the improved suction operated accessory system incorporated in a motor vehicle.
Figure 2:
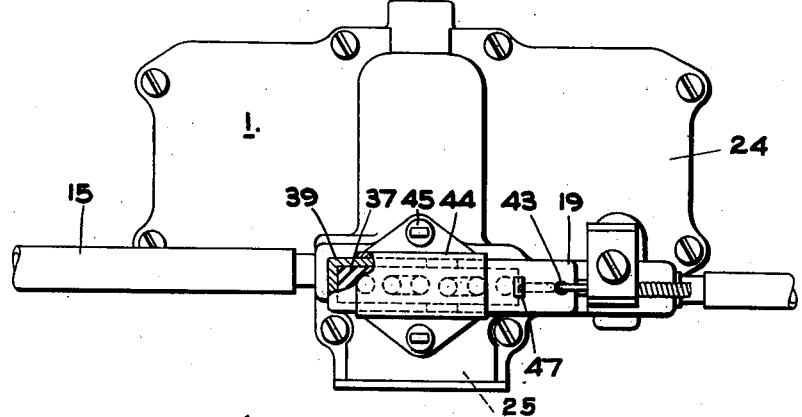
Fig. 2 is a top plan view of the improved windshield cleaner motor employed in such accessory system.
Figure 3:
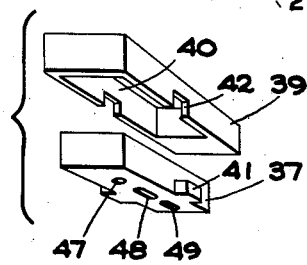
Fig. 3 is an exploded perspective view of the accessory valve.

Referring more particularly to the drawings, the numeral 1 designates the windshield cleaner motor mounted on the vehicle dash 2 at the engine side thereof and having its rock shaft 3 protruding therethrough into the passenger compartment. A cross arm 4 is fixed to the protruding shaft end and on each end of the cross arm is a crank pin 5. The windshield surface is usually cleaned by a pair of wipers, one of which is shown at 6 in Fig. 1, such wiper having its actuating arm 7 mounted on an actuating shaft 8 which in turn is oscillated by a pair of flexible cables 9 trained over suitable guide pulleys 10 and 11 and joined to their respective crank pins 5 by connector blocks 12, all as is more fully described in Patent No. 2,572,750, October 23, 1951.

The numeral 13 designates the intake manifold of the vehicle's internal combustion engine, the manifold being connected by a suction line 15 to the windshield cleaner motor 1, with a reserve tank 16 being interposed in the suction line between the motor and a check valve 17 so as to maintain the suction reserve in the tank 16 when the manifold pressure approaches that of the outside atmosphere. A hand knob 18 is connected by a flexible wire 19 to the motor so that the latter may be operated at will. Also, under the control of this knob 18 is a windshield washing unit having a suction actuating pump 20 constructed and operating in accordance with the disclosure of Patent 2,142,056. When the washer is in operation the liquid solvent will be discharged by the pump and through a nozzle 21 onto the windshield 22 in the path of the wiper 6.

The windshield cleaner motor comprises a body casting 23 and a removable cover 24 for the body chamber. It further embodies an automatic valve mechanism which is enclosed within the valve chamber 25 and includes the oscillatory valve 26 that pivots on the motor shaft 3 between two operative positions. The automatic valve mechanism also includes a kicker element 27 actuating between spaced ears 28 on the valve. This construction is well known in the windshield cleaner art, the kicker being moved by the shaft 2 to an over center position from which it is snapped by a spring 27' into engagement with the forward one of the ears 28 for carrying the valve to the other one of its two operative positions. The valve 26 therefore oscillates back and forth on its seat 29 formed on the cover plate 24 for alternately connecting the pressure or suction supply port 30 to the two chamber ports 31 and 32. The chamber port 32 opens into the motor chamber 23 through a passage 33 about which is formed a parking seat 34 and consequently when it is desired to park the wiper the source of suction will be connected to the parking passage 33 thereby to cause the piston 35 to engage the seat 34. Carried by the piston is a valve disk 36 anchored at its center, as by a rivet, to thereby leave the marginal portion of the disk free to contact the seat. The valving disk 36 is formed of soft gummy rubber, or the like, for effectively sealing off the flow of air into the passage 33 when engaged with the parking seat 34. This insures against the dissipation of the subatmospheric pressure reserve in the tank 16. A common control is provided for both the windshield cleaner unit as well as the windshield washing unit and is designed to operate the units either selectively or conjointly.

This common control comprises a valve body 37 of soft gummy rubber adapted to seal itself under the pressure differential normally maintaining in the low pressure system, the term rubber, including like gummy material synthetic or otherwise. This rubber body, like that of the valving disk 36, is of a gummy consistency which, when subjected to the relatively small pressure differential obtainable between suction on the one side and the outside atmosphere on the other, will tend to cling to its seat on which it is designed to slide. This seat is indicated at 38 and is preferably formed on the motor cover 24 at the time of die casting the same. Because of its extreme yieldability, the valve will readily conform itself to any irregularity in the molded surface. To counteract the tenacious or clinging characteristic of the rubber body 37, the latter is enveloped by a metal housing 39 which has a recess 40 comfortably fitting the same in its normal state to impart support thereto. Midway of its length the rubber valve body is interlocked by lateral ears 41 interengaging in notches or seats 42 formed in the side wall of the chamber 40. Consequently, when the housing is moved it will slide the rubber valve body on its seat 38, and by reason of the interlock 41, 42 midway of the length of the body the latter will be compelled to move bodily with the housing and without substantial longitudinal compression of the rubber material. The ears 41 extend laterally in the plane of the seat engaging face of the rubber body so that the interlock will serve to hold the yieldable body down on its seat. The housing has an opening 43 in which the down turned free terminal of the push-pull wire 19 engages. Consequently when the knob 18 is manipulated in either direction from a neutral position it will impart a sliding movement to the housing and a coextensive movement to the rubber valve body. Any substantial compression of the rubber body is prevented by the midway interlock which may be duplicated at various intervals if desired. The rim of the inverted cup-shaped housing 39 also has sliding support on the seat to aid in breaking any adhesion of the rubber body thereto sufficient for the sliding movement, but nevertheless the rubber body will be free to engage the seat in exact conformance to its surface contour by reason of its play connection with the housing.

A channeled guide 44 slidably embraces the housing to guide the same in its movement, the guide being fixed to the motor cover 24 by suitable fasteners 45. A lug 46 on the housing is adapted to engage the guide 44 (Fig. 5) to limit the innermost movement of the control valve. The rubber valve body has a cavity 47 and a pair of grooves 48 and 49, such grooves cooperating with a longitudinal series of ports 50, 51, 52, 53, 54 and 55 in the seat to regulate the motor. As shown in Fig. 4, the ports 50 and 54 communicate with the suction supply passage 56, leading from a nipple 57 to which the suction line 15 is connected; the port 51 communicates with the supply port 30 in the seat 29 of the automatic valve mechanism; and the port 52 communicates with the similarly located chamber port 32, while the port 53 is in communication with the parking port 33. These five ports 50, 51, 52, 53 and 54 may be uniformly circular in cross section, while the washer port 55 is in the form of a slot and communicates with a nipple 58 which, in turn, is connected by the hose 59 to the suction pump 20 of the washer unit.

With the control valve in its innermost position, as determined by the stop 46 in the position of Fig. 5, the port connecting passage or groove 48 establishes communication between ports 50 and 51 and consequently connects the supply port 30 to the source of suction, while the port connecting passage 49 joins the chamber port 32 to the parking port 33. This is the running position of the windshield cleaner wherein the automatic valve mechanism will trip the valve 26 to cause the piston 35 to oscillate back and forth for actuating the wiper 6.

To arrest the wiper and park it to one side of the field of vision through the windshield, the control valve will be pulled to its intermediate position shown in Fig. 6 wherein the port connecting passage 48 will connect the ports 51 and 52 to vent the left side of the motor chamber, and the port connecting passage 49 will connect the parking port 53, and consequently the passage 33 to the constant suction supply port 54. This provides the necessary pressure differential in the motor chamber to move the piston 35 to the extreme right, Fig. 6, wherein the valving disk 36 will seal off the parking port from the remainder of the motor chamber.

When the control valve is in its motor arresting position, the cavity or recess 47 is over the constant suction supply port 50 and consequently the soft rubber material of the valve body will not be drawn down into the port. This provision precludes the formation of a pimple or projection on the seat engaging face of the rubber valve during long periods of non-use. Consequently, the true and prescribed seating engagement of the valve is maintained throughout the life of the motor whereby a thorough and effective sealing contact is secured for the maximum efficiency from the accessory system.

Fig. 7 illustrates the control valve in its outermost position wherein the passage 48 is idle but the passage 49 connects the pressure supply port 54 to the washer port 55. In this position of the control valve the source of operating pressure will be connected to the suction actuated pump 20 for intaking a charge of the liquid solvent from the reservoir 61. Upon the release of the hand knob 18 the backing spring 62 will serve to restore the control valve to its intermediate or neutral position shown in Fig. 6, the coil spring 62 backing a plunger 63 which normally projects into contact with and determines the neutral position of the control valve. The washer motor 20 will function on its solvent intaking stroke only while the control valve is manually held in the position of Fig. 7 against the action of the compressed spring 62, and immediately upon the release of the hand knob 18 the spring urged plunger 63 will act to restore the control valve to the intermediate position of Fig. 6. The plunger 63 operates in a chamber 64 formed in the boss 65 to which latter the armored housing 66 of the push-pull wire 19 is secured, as by a clamp 67 and its retaining screw 68.

From the foregoing it will be observed that the common control may be manipulated to initially start the washer in operation and thereafter cause the windshield cleaner to scrub the wetted surface clean for clear vision therethrough. Upon the return of the control valve from the position shown in Fig. 7 the spring actuated plunger in the pump 20 will eject a spray or jet of liquid from the nozzle 21 up onto the windshield in the path of the wiper. This spraying action will occur initially and prior to the actuation of the windshield cleaner so that the windshield surface will be wet at the time of initiating the action of the wiper 6. This is especially desired when removing vision obscuring matter, such as insects and dust, from the field of vision during clear weather. When it becomes necessary to operate the wiper during inclement weather from which the windshield is already wet it will be unnecessary to operate the washer, and therefore the control valve will be moved from its neutral position of Fig. 6 directly to the motor running position of Fig. 5.

Since both the valve disk 36 and the control valve 37 are of a soft rubber formation to effectively seal the system against air leakage in the presence of the low pressure differential, it will be observed that the entire system is sealed against the dissipation of the reserve vacuum in the storage tank 16. Because of the blind recess 47 which blocks or overlies the inactive one of the two constant suction supply ports when the control is in its neutral or parked position, the possibility of a nib or pimple being formed on the seat contacting face is eliminated and the valve face is preserved in a true state. Otherwise such a pimple would take a set and thereby produce a malformation which would tend to unseat the valve and cause leakage when the valve is next shifted to its running position.

In Fig. 8 is depicted a modified form of control valve in which the soft rubber valve body 37' is given sustaining support by the housing 39', the latter having interlocking lugs 41' serving to unite the sustaining body to the rubber valve body of soft gummy texture. These lugs or ears 41' preferably extend into close proximity to the seat contacting face to more readily break any adhesion between the body and its seat. This facilitates the movement of the gummy body as it slides on its seat and serves to support the body against rolling or buckling through the longitudinal compression. In both forms of the valve the rigid supporting member is so arranged as to assist in sustaining the readily yieldable valve body of soft gummy texture in a predetermined shape against materially deforming the shape of the port closing passages as well as breaking the airtight seal between the valve face and its seat. Being of this consistency the rubber will readily conform itself, under the small pressure differential, to any irregularity in the flat surface of the seat. In the manufacture of the modified valve, Fig. 8, the sustaining support 39' could be wholly embedded in the soft rubber valve body to dispose it in the desired proximity to the seat contacting face.

The system will conserve the reserve suction supply, which of necessity is limited to a small pressure, until used and therefore it will enable the joint as well as the selective operation of the washer and wiper as found necessary. Consequently, other accessories may be incorporated in the system for suction actuation. The washer pump may embody a simple form of diaphragm 69 backed by a spring 70 for ejecting the solvent after the suction communication has been interrupted by movement of the control valve to its neutral position.

While the foregoing description has been given in detail, it is not intended thereby to limit the inventive principles involved which latter may be applied to other physical embodiments without departing from the spirit of the invention and its scope claimed.

What is claimed is:

1. An accessory system for motor vehicles, comprising a windshield cleaner having a fluid pressure operated motor and a connected wiper, a windshield washer having a pressure operated pump, a source of operating pressure, a supply line connecting the source of pressure supply to both the windshield cleaner as well as the windshield washer, a control valve selectively operable to actuate either the windshield cleaner or the windshield washer, and means acting automatically to restore the control valve to an intermediate neutral position following operation of the washer.

2. An accessory system for motor vehicles, comprising a windshield cleaner having a fluid pressure operated motor and a connected wiper movable thereby back and forth on the windshield surface, a windshield washer having a pressure operated pump, a source of operating pressure, a supply line connecting the source of pressure supply to both the windshield cleaner and the windshield washer, a control valve having a longitudinal series of ports connecting with said cleaner and said washer and one port constituting a pressure supply port, said valve also having a valving part movable along the series of ports to opposite sides of a neutral position for successively connecting the washer and cleaner, and resilient means serving to determine the neutral position and yieldable to permit said valving part moving to a position for connecting the washer to the supply port.

3. An accessory system for motor vehicles, comprising a windshield cleaner having a fluid pressure operated motor and a wiper oscillatable thereby back and forth on the windshield surface, a windshield washer having a pressure operated pump, a source of operating pressure, a supply line connecting the source of pressure supply both to the windshield cleaner and to the windshield washer, and a control valve having a neutral position wherein the wiper is fluid parked, means for moving the control in one direction from its neutral position for actuating the washer and in the opposite direction from its neutral position for actuating the cleaner.

4. An accessory system for motor vehicles, comprising a windshield cleaner having a fluid pressure operated motor for oscillating a wiper back and forth on the windshield surface, a windshield washer having a pressure operated pump, a source of operating pressure, a supply line connecting the source of pressure supply both to the windshield cleaner and to the windshield washer, and a control valve having a neutral position wherein the wiper is fluid parked, means for moving the control in one direction from its neutral position for actuating the washer and in the opposite direction from its neutral position for actuating the cleaner, and means acting automatically to restore the control from its washer actuating position to its neutral position.

5. A suction actuated accessory system for motor vehicles, comprising a windshield cleaner having a fluid pressure operated motor for oscillating a wiper back and forth on the windshield surface, said motor having a chamber with a parking port and a piston movable back and forth in the chamber, a windshield washer having a pressure operated pump, a source of operating pressure, a supply line connecting the source of suction supply both to the windshield cleaner and to the windshield washer, and a control valve having a position wherein the wiper is fluid parked, said piston having a soft rubber valving disk normally seating over the parking port and acted upon by the pressure reserve to seal the same against leakage.

6. An accessory system for motor vehicles comprising a windshield cleaner having a fluid pressure operated motor and an oscillatory wiper movable thereby on the windshield surface, a windshield washer having a pressure operated pump, a source of operating pressure, a supply line connecting the source of pressure supply both to the windshield cleaner and to the windshield washer, and a control valve having a position wherein the wiper is fluid parked, means for moving the control in one direction for actuating the washer and in another direction for actuating the cleaner, said cleaner motor having a parking port and a piston with a soft rubber valving disk for seating over the parking port to seal the same against leakage, and said control valve having a valve part formed of soft rubber for sealing contact with its seat and cooperating with the valving disk under the constant urge of the pressure reserve to prevent the dissipation of the suction from the reserve chamber.

7. A windshield cleaner motor having a chamber, a piston therein, a shaft journaled in the chamber and operatively connected to the piston, automatic valve mechanism connected for operatively admitting fluid pressure to the chamber for moving the piston back and forth, said motor having a valve seat with plural ports therein, a control valve of soft rubber slidably engaging the seat and having a port connecting passage therein for connecting a supply port to a chamber port in one position and disconnecting such ports in another position by blocking the supply port, the port blocking portion of the soft rubber control being formed with a blind recess to preclude the formation of a pimple on the seat engaging face of the control valve incidental to the continuous application of suction thereto through the blocked port.

8. A windshield cleaner motor having a chamber, a piston therein, a shaft journaled in the chamber and operatively connected to the piston, automatic valve mechanism operable by the shaft and acting to operatively admit fluid pressure to the chamber for moving the piston back and forth, said automatic valve mechanism having a supply port and two chamber ports with a valve movable back and forth to connect the supply port alternately with the chamber ports, said motor having a control valve seat with a pair of interconnected pressure supply ports and an interposed group of three additional ports, one of the latter ports communicating with the supply port of the automatic valve mechanism, another of the group of ports communicating with one chamber port in the valve seat of the automatic valve mechanism, and the third of the group of ports communicating with a parking port opening into the chamber at one side of the piston, a control valve engaging the valve seat and having a pair of port connecting passages, one of the latter acting to connect one of the pressure supply ports to the first mentioned one of the group of three ports and the other port connecting passage acting to connect the remaining two ports of the said group for normal operation of the motor, and said other port connecting passage also serving to connect the other of said pressure supply ports to said parking port when the motor is in arrested position, the several ports in the control valve seat being arranged in a longitudinal series.

9. A windshield cleaner motor having a chamber, a piston therein, a shaft journaled in the chamber and operatively connected to the piston, automatic valve mechanism for operatively admitting fluid pressure to the chamber for moving the piston back and forth and having a valve seat with a supply port and two chamber ports, said motor having a valve seat with plural pressure supply ports interconnected and an interposed group of three additional ports, one communicating with a pressure supply port in the valve seat of the automatic valve mechanism, another communicating with a chamber port in the valve seat of the automatic valve mechanism, and the third communicating with a parking port opening into the motor chamber, a soft rubber control valve engaging the first seat and having a pair of port connecting passages, one for connecting one of the pressure supply ports to the first mentioned one of the group of three, and the other to connect the remaining two ports of the said group for normal operation of the motor, and said other port connecting passage serving to connect the other of said pressure supply ports to the parking port when the motor is in arrested position, and a soft rubber valving disk carried by the piston for engaging over the parking port in fluid tight seal to cooperate with the soft rubber control valve in sealing the passages through the motor against air leakage when the motor is in arrested position.

10. A windshield cleaner motor having a chamber, a piston therein, a shaft journaled in the chamber and operatively connected to the piston, automatic valve mechanism for operatively admitting fluid pressure to the chamber for moving the piston back and forth, said motor having a valve seat with plural pressure supply ports interconnected and an interposed group of three additional ports, one communicating with a pressure supply port in the valve seat of the automatic valve mechanism, another communicating with a chamber port in the valve seat of the automatic valve mechanism, and the third communicating with a parking port opening into the motor chamber, a control valve engaging the first seat and having a pair of port connecting passages, one for connecting one of the pressure supply ports to the first mentioned one of the group of three, and the other to connect the remaining two ports of the said group for normal operation of the motor, and said other port connecting passage serving to connect the other of said pressure supply ports to the parking port when the motor is in arrested position, said control valve seat also having an accessory port adapted to be connected to said other pressure supply port when the control valve is moved to another position, the several ports in the control valve seat being arranged in a longitudinal series.

11. A control valve for suction operated motors, comprising a seat having plural ports, a rubber valve body having a flat face slidable along the seat and formed with a port connecting passage extending in the direction of sliding movement of the valve, the rubber of the valve body having a soft but resilient texture and being responsive to the pressure differential as provided by the atmospheric pressure on one side and a subatmospheric pressure on the opposite side whereby to effect a fluid tight seal with the seat, said seat engaging face of the rubber valve body having a port closing portion formed with a blind recess to preclude the pressure differential forcing such portion of the seat engaging face down into the port when thereover, and a rigid sustaining support for the rubber valve body having interlocking connection therewith in a plane in proximity to the seat engaging face thereof.

ANTON RAPPL.

REFERENCES CITED

The following references are of record in the file of this patent:

UNITED STATES PATENTS

| Number | Name | Date |
|---|---|---|
| 586,433 | Graffin | July 13, 1897 |
| 1,006,964 | Lyons | Oct. 24, 1911 |
| 1,295,394 | Voorhees | Feb. 25, 1919 |
| 1,797,977 | Folberth | Mar. 24, 1931 |
| 1,840,233 | Hueber | Jan. 5, 1932 |
| 1,855,913 | Hueber | Apr. 26, 1932 |
| 2,153,519 | Horton | Apr. 4, 1939 |
| 2,306,778 | Carney | Dec. 29, 1942 |
| 2,351,732 | Almond | June 20, 1944 |
| 2,352,120 | Rappl | June 20, 1944 |
| 2,436,462 | Utter | Feb. 24, 1948 |